United States Patent [19]

Resz et al.

[11] Patent Number: 4,514,546
[45] Date of Patent: Apr. 30, 1985

[54] COATING POWDER BASED ON SAPONIFIED ETHYLENE/VINYL ACETATE COPOLYMERS AND THE USE THEREOF

[75] Inventors: Raoul Resz, Bergisch Gladbach; Heinrich Alberts, Odenthal-Blecher; Hans-Heribert Burgdörfer, Cologne; Aziz El Sayed, Leverkusen, all of Fed. Rep. of Germany

[73] Assignee: Bayer Aktiengesellschaft, Leverkusen, Fed. Rep. of Germany

[21] Appl. No.: 577,607

[22] Filed: Feb. 6, 1984

[30] Foreign Application Priority Data

Feb. 17, 1983 [DE] Fed. Rep. of Germany ....... 3305353

[51] Int. Cl.$^3$ .............................................. C08L 29/04
[52] U.S. Cl. ..................................... 525/57; 427/195; 525/924
[58] Field of Search ................... 525/57, 924; 427/195

[56] References Cited

U.S. PATENT DOCUMENTS 3,524,905  8/1970  Coates ................................... 525/57
3,809,667  5/1974  Coaker et al. ....................... 524/311
4,009,131  2/1977  Farone ................................. 427/195

Primary Examiner—Jacob Ziegler
Attorney, Agent, or Firm—Connolly and Hutz

[57] ABSTRACT

This invention relates to the production and use of coating powders based on saponified ethylene/vinyl acetate copolymers (EVA copolymers) modified with polyalkyl (meth) acrylates. Coatings and films produced from these coating powders are distinguished by the flexibility and elasticity thereof, especially at low temperatures.

3 Claims, No Drawings

COATING POWDER BASED ON SAPONIFIED ETHYLENE/VINYL ACETATE COPOLYMERS AND THE USE THEREOF

This invention relates to the production and use of coating powders based on saponified ethylene/vinyl acetate copolymers (EVA copolymers) which are modified with polyalkyl (meth) acrylates. Coatings and films produced from these coating powders are distinguished by the flexibility and elasticity thereof, especially at low temperatures.

It is known from DE-PS No. 1,669,151 that saponified ethylene/vinyl acetate copolymers may be used as a coating material for metal, ceramics, glass or wood by the various techniques of powder coating (e.g. the whirl sintering process, flame spray process or electrostatic powder coating process). The size and nature of the powder particles must be adapted to the particular requirements of the coating process employed. Thus, for example, the whirl sintering process requires the use of a powder having a particle size predominantly in the range of from 50 to 250 μm in diameter.

The powders used for the electrostatic powder coating process generally have a particle size substantially below 100 μm in diameter.

The properties of the above-mentioned coating powders are satisfactory for numerous applications, but coatings obtained by applying these powders to massive objects having a high thermal capacity by the whirl sintering process tend to form cracks at temperatures below 0° C. in areas excessively subjected to thermal expansion and contraction, e.g. at internal edges. In spite of firm adherence of the coatings, corrosive substances are liable to enter at these points and start a process of corrosion.

It is therefore desired to use coating materials which are elastic and stretchable even at low temperatures and are superior to the saponified ethylene/vinyl acetate copolymers hitherto known.

Somewhat improved low temperature characteristics may be obtained by only partially saponifying the ethylene/vinyl acetate copolymers, but the production of such materials entails considerable economic disadvantages for technical reasons. For example, breaking down the particle size of such EVA copolymers gives rise to considerable difficulty owing to the elastic properties thereof. Furthermore, it has been found that partial saponification is accompanied by a reduction in the high solvent resistance found in highly saponified products.

The above-mentioned saponified ethylene/vinyl acetate copolymers tend to form uneven surfaces scattered with craters when used for the production of thin coatings of from 60 to 150 μm. This effect is particularly pronounced when the powder is employed by the electrostatic powder sintering process (EPS process).

Such coatings are therefore neither visually satisfactory nor do they afford sufficient protection of the underlying surface against corrosion. When the coatings are applied to metal by the whirl sintering process, the surface characteristics of the resulting coatings may be unsatisfactory as regards the smoothness and gloss thereof.

Apart from the economic interest involved, there is therefore also a demand, for the sake of the quality of the coating, to modify the properties of saponified ethylene/vinyl acetate copolymers so that they will be suitable for new fields of application.

This desired improvement in the product quality may be achieved economically by the addition of polyalkyl (meth) acrylate resins as additives to saponified ethylene/vinyl acetate copolymers.

It is known from DE-OS No. 1,918,893 and from US-PS No. 3,809,667 that the processing characteristics and sliding characteristics, for example of a vinyl aromatic, thermoplastic resin, may be improved by the addition of small quantities of polymers of an alkyl acrylate.

Such a product is by Monsanto Co. under the trade name "Modaflow ®" as modifying and levelling agent for resins and lacquers, in particular for alkyd resins and epoxy resins.

It is also known from DE-OS No. 2,507,411 that liquid alkyl acrylate copolymers may be used as levelling agents in powder coating formulations.

Examples of polymers in which these additives may be used include thermosetting and thermoplastic polymers, such as polyamides, polyurethanes, epoxy resins, polyester resins, acrylate resins, polyolefins and copolymers thereof with ethylenically unsaturated monomers, polystyrene, cellulose esters, polycarbonates and phenol/aldehyde resins.

It has now been found that the addition of small quantities of polyalkyl (meth) acrylate to saponified ethylene/vinyl acetate copolymers which contain ethylene and vinyl acetate in molar ratios of from 2:1 to 20:1 and are saponified to a degree of hydrolysis of from 80 to 100% improves not only the levelling properties of the coating powders obtained, but also numerous other properties which are important for the coating process, such as resistance to cracking and tearing at low temperatures and the flexibility and elasticity. An improvement in these properties is highly important for the usefulness of these coating materials because it opens up fields of application which have hitherto been closed to these materials on account of the unfavourable response thereof to low temperatures.

The present invention therefore relates to polymer mixtures consisting of:
 (1) from 99.95 to 80%, by weight of one or more saponified ethylene/vinyl acetate copolymers; and
 (2) from 20 to 0.05, by weight of one more more (meth) acrylic acid alkyl ester homo- and copolymers having $C_1$–$C_{24}$ alkyl groups in the ester component;

The present invention also relates to the use of saponified ethylene/vinyl acetate copolymers modified predominantly with poly (meth) acrylate homo- and copolymers having the above composition, as coating powders.

Polyalkyl (meth) acrylates suitable for the purposes of the present invention include those in which the alkyl group, which may be either straight- or branched-chain, has from 1 to 24, preferably 4 to 10, carbon atoms. They may be either homopolymers or copolymers of various (meth) acrylates. Copolymers may be obtained by the polymerisation of alkyl (meth) acrylate mixtures which may consist of from 2 to 20 different alkyl (meth) acrylates.

The polyalkyl (meth) acrylates have the consistency of free running liquids to viscous fluids at temperatures of from about 20° to 150° C. The molecular weights thereof are from 2,000 to 100,000, preferably from 3,000 to 50,000. The molecular weights up to 20,000 may be determined by vapour pressure osmometry, while higher molecular weights may be determined osmometrically.

It is preferred to use copolymers of alkyl (meth) acrylates, in which from 5 to 95%, by weight, of the alkyl (meth) acrylates incorporated by polymerisation have from 2 to 5 carbon atoms in the alkyl group, while from 95 to 5%, by weight, of the alkyl (meth) acrylates have from 6 to 24 carbon atoms. Those copolymers which have alkyl (meth) acrylate monomers having from 2 to 5 carbon atoms in the alkyl groups of one monomer and from 6 to 12 carbon atoms in the alkyl group of the other monomer are particularly preferred.

Examples of suitable monomers for the purposes of the present invention include methyl acrylate, ethyl acrylate, n-propyl acrylate, isobutyl acrylates, n-butyl acrylate, tertiary butyl acrylate, pentyl acrylate, isopentyl acrylate, hexyl acrylate, 2-ethylhexyl acrylate, decyl acrylate, dodecyl acrylate, tetradecyl acrylate, octadecyl acrylate, eicosyl acrylate and the corresponding methacrylates; also (meth) acrylic acid alkyl esters containing hydroxyalkyl groups, such as β-hydroxyethyl (meth) acrylate and β-hydroxypropyl (meth)acrylate. Up to 30%, by weight, of the alkyl (meth) acrylate component may be replaced by one or more other vinyl monomers.

Ethylene/vinyl acetate copolymers suitable for the purposes of the present invention contain ethylene and vinyl acetate in a molar ratio of from 2:1 to 20:1 before saponification and have been saponified to a degree of hydrolysis of from 80 to 100%.

The ethylene/vinyl acetate copolymers preferably contain ethylene and vinyl acetate in a molar ratio of from 10:1 to 4:1 before saponification and the degree of saponification/hydrolysis is preferably from 90 to 100%.

The ethylene/vinyl acetate copolymers suitable for the purposes of the present invention may be obtained by known methods in the presence of polymerisation initiators acting as radical initiators and at pressures of from 100 to 4,000 bar and temperatures of from 30° to 250° C. The average molecular weight thereof may vary within wide limits. The copolymers used preferably have an average molecular weight of from 10,000 to 50,000. They generally have melt indices (determined according to DIN 53735 at 190° C. under a load of 30.2 g/mm$^2$) of from 0.5 to 200 g/10 min, preferably from 5 to 100 g/10 min.

Saponification of the ethylene/vinyl acetate copolymers may be carried out by known methods.

The composition of the saponified ethylene/vinyl acetate copolymers is important in determining whether they are suitable for use as coating powders. Since great hardness, a high melting point and high solvent resistance are advantageous in practice, it is advantageous to use ethylene/vinyl acetate copolymers which are from 90 to 100% saponified.

Saponified ethylene/vinyl acetate copolymers which contain ethylene and vinyl acetate in a molar ratio of from 10:1 to 4:1 before saponification are particulary suitable for the purposes of the present invention. These saponified ethylene/vinyl acetate copolymers contain from 13 to 30%, by weight, of vinyl alcohol incorporated by polymerisation.

They have good resistance to light, air and weathering. Suitable stabilizers may be added to improve these properties. Suitable stabilizers, for example, against UV light, include, e.g. substituted crotonic acid esters, benzophenone derivatives and benzotriazoles (e.g. DE-OS No. 1,087,902, Belgian Pat. No. 625,007 and GB-PS No. 878,362).

The properties of the polymer mixtures according to the present invention are generally preserved when up to 30%, by weight, of the (meth) acrylic acid ester component is replaced by one or more other vinyl monomers.

Additives, e.g. fillers, plasticizers, dyes and pigments, nay be added to the coating powders in the conventional mixing apparatus. The quantity of pigments added is normally from 0.5 to 30%, by weight, Examples of suitable pigments include titanium dioxide, chromium oxide green, ultramarine, cadmium red and cadmium yellow, carbon black. Metallic effects may be obtained by the addition of aluminium or bronze powder. Light-weight, impact resistance coatings may be obtained by foaming the layer using organic blowing agents (e.g. azodicarbonamide or diphenyl sulphone-3,3'-disulphohydrazide).

Work pieces, preferably made of metal, are coated by the coating process described below, but articles made of ceramics, glass, wood or synthetic resins may also be coated by this process, provided they are able to withstand the heat required for melting the synthetic resin powder. The surface of the article to be coated should preferably be freed from fats, oils or other impurities (e.g. oxide layers), either by means of solvents or by a mechanical cleaning process, before being coated.

The surface to which the coating is to be applied may be roughened, for example, by sand blasting, brushing or etching in order to improve the bond of the synthetic resin layer. The copolymers used according to the present invention sometimes adhere so firmly to the surface that such a preliminary treatment is not necessary.

The coatings according to the present invention have good resistance to numerous organic solvents.

The particle size of the coating powder according to the present invention is generally from 40 to 300μ (diameter), preferably from 50 to 250μ (diameter), for the whirl sintering process; preferably from 80 to 200μ (diameter) for the flame spraying process; and preferably from 10 to 120μ (diameter) for the electrostatic coating process. The polymer powders are produced by the conventional methods, e.g. by grinding them in an impact plate mill and then passing them through a screen or by a suitable method of precipitation from a solution. The powders may also be obtained by the process according to Be-PS No. 702,062.

Coating powders for the purposes of the present invention contain from 0.05 to 20%, by weight, preferably from 0.1 to 5%, by weight, of one or more alkyl (meth) acrylate homopolymers and copolymers in addition to the saponified EVA copolymers.

The addition of the polyacrylate to the saponified ethylene/vinyl acetate copolymer may be carried out by known methods, e.g. as described in DE-OS No. 2,611,548. Another method of adding the polyacrylate involves for example, the after-treatment of a precipitated, size-reduced, porous, saponified ethylene/vinyl acetate copolymer in aqueous suspension with a solution of the polyalkyl acrylate in a solvent which is immiscible with water (e.g. toluene, petroleum ether, gasoline for cleaning, cyclohexane, n-heptane, ethyl acetate, chlorinated hydrocarbons, such as chloroform, methylene chloride or trichloroethylene ).

One simple method, for example, involves introducing the (meth) acrylate additive used according to the present invention into the transesterification reaction side-by-side with the EVA copolymer and then working-up the reaction product in the conventional manner.

The saponified ethylene/vinyl acetate copolymers used according to the present invention may also be mixed with the poly (meth) acrylates in a kneader or an extruder.

The coating powders used according to the present invention may be produced by grinding the granulates obtained.

The coatings obtained from the coating powders according to the present invention serve as corrosion protection and as protection against mechanical wear for articles made of metal, e.g. steel, cast steel, copper, brass, bronze, red brass, aluminium and alloys thereof, as well as procelain, ceramics, polymer products and various types of wood. They may be used in the electrical industry as electrically insulating coatings, e.g. for lights, switches, parts of motors. Other examples of applications include domestic applicances, refrigerator grids, coat racks, towel holders, shop fittings, sales counters, decorative articles, baskets and bottle holders, and external and internal coatings on tubes and containers.

The present coatings are further distinguished by the advantageous properties thereof, especially at low temperatures.

EXAMPLE 1

10,000 g of an ethylene/vinyl acetate copolymer containing 34.4%, by weight, of vinyl acetate incoporated by polymerisation (melt index of 84 g/10 min determined according to DIN 53735 at 190° C. and a load of 2.16 kg) are dissolved in 17,000 g of toluene in a 40 liter refined steel stirrer vessel. 5,000 ml of solvent are distilled off to remove by azeotropic distillation the small quantities of moisture invariably present. The clear solution obtained is then cooled to about 55° C. and 5044 g of methanol, followed by a solution of 200 g of sodium methylate in 640 g of methanol, are added.

When the mixture has been refluxed for 1 hour, 7,600 ml of a mixture of methyl acetate, methanol and toluene are distilled off at a rate of about 1200 ml per hour over a column of filling bodies. 222 g of glacial acetic acid are then added and 42 g of an alkyl acrylate copolymer containing 30%, by weight, of ethyl acrylate incorporated by polymerisation and 70%, by weight, of 2-ethylhexylacrylate (molecular weight 6,000 determined by vapour pressure osmometry) and 2520 g of a titanium dioxide white pigment are introduced with stirring at a reaction temperature of 60° C. The mixture is then homogenized at 60° C. The organic solvents are distilled off by steam distillation under reduced pressure with stirring. The resulting porous granulate of particles measuring from 500 to 2000 μm in diameter is filtered off, washed with water and dried. The dried material is then ground to particles smaller than 250 μm. 100% by weight of the resulting coating powder yield by combustion 22.6%, by weight, of ash consisting predominantly of titanium dioxide. The vinyl acetate content of the polymer, incorporated by polymerisation, is calculated from the saponification number to be 2.4%, by weight. The melt index determined according to DIN 53735 at 150° C. under a load of 2.16 kg is 5.53 g/10 min. The cold fracture temperature determined according to DIN 53372 is found to be −32° C.

EXAMPLES 2 to 5

2,500 g of a saponified ethylene/vinyl acetate copolymer containing 2.43%, by weight, of vinyl acetate incorporated by polymerisation, 18.64%, by weight, of vinyl alcohol and 78.93%, by weight, of ethylene (melt index 7.14 g/10 min determined according to DIN 53735 at 150° C. and under a load of 2.16 kg) obtained as described in Example 1, but without the addition of modifier or titanium dioxide pigment, and isolated as described therein are dissolved in a mixture of 3514 g of toluene and 929 g of methanol by refluxing in a 10 liter refined steel stirrer vessel. A modifier having the composition indicated in Table 1 is then added in the quantity indicated in the form of a solution in 200 g of toluene and the mixture is stirred until homogeneous. Isolation of the polymer from the solution and production of the coating powder are carried out by the method described in Example 1.

The coating powders obtained having a particle size of from 80 to 200 μm (diameter) were applied by the whirl sintering process to "Teflon"-coated copper plates measuring about 150×110 mm and 2 mm in thickness to form a smooth surface thereon by preheating the plates to from 250° to 300° C. for 7 minutes and then immersing them in the fluidized bed for 6 seconds. The resulting coatings, about 500 μm in thickness, are easily stripped off, and samples measuring 60×15 mm are punched out of these coatings and used to determine the cold fracture values at low temperatures according to DIN standard 53372. The results are summarised in the following Table. This Table also includes the test results obtained for the unmodified product. The surface characteristics apparent on coatings obtained by the EPS process using particles smaller than 80μ are also shown in the Table.

The Table gives information on the characteristics of saponified EVA copolymers which have not been modified by the process described above. The values given demonstrate the effect of the modifying agent (sharp reduction in the cold fracture temperature).

TABLE 1

| | Composition and properties of the coating materials of Examples 2 to 5 | | | | | | | |
|---|---|---|---|---|---|---|---|---|
| | Modifier added Composition of the copolymer: | | | | Molecular weight (determined by vapour pressure osmometry) | Modifier content of the coating powder (%, by wt) | Cold fracture temperature according to DIN 53372 (°C.) | Assessment of surface characteristics of coatings prepared by the EPS process | |
| | Monomer I | | Monomer II | | | | | | |
| Example number | Chemical name | Proportion (%, by wt) | Chemical name | Proportion (%, by wt) | | | | layer thickness (μm) | appearance |
| 2 | 2-ethyl hexyl-acrylate | 70 | ethyl-acrylate | 30 | 12000 | 1.0 | −28 | Ca. 100 | free from craters |
| 3 | 2-ethyl hexyl-acrylate | 70 | ethyl-acrylate | 30 | 12000 | 0.5 | −29 | 90 to 110 | free from craters |
| 4 | n-butyl- | 75 | n-butyl- | 25 | 15000 | 1.0 | −28 | 60 | free from |

TABLE 1-continued

Composition and properties of the coating materials of Examples 2 to 5

| Example number | Modifier added Composition of the copolymer: Monomer I Chemical name | Proportion (%, by wt) | Monomer II Chemical name | Proportion (%, by wt) | Molecular weight (determined by vapour pressure osmometry) | Modifier content of the coating powder (%, by wt) | Cold fracture temperature according to DIN 53372 (°C.) | Assessment of surface characteristics of coatings prepared by the EPS process layer thickness (μm) | appearance |
|---|---|---|---|---|---|---|---|---|---|
| | acrylate | | meth-acrylate | | | | | | craters |
| 5 | n-butyl-acrylate | 100 | | | 11000 | 0.5 | −24 | 150 | free from craters |
| Comparison Example | — | — | — | — | — | — | −15 | Ca. 100 | many craters |

EXAMPLE 6

A mixture of 70 kg of a saponified ethylene/vinyl acetate copolymer (melt index according to DIN 53735 at 150° C. and under 2.16 kg load: 12.8 g/10 min, vinyl acetate content 2.4%, by weight, vinyl acetate content in the starting polymer, 38.5%, by weight), 30 kg of titanium dioxide and 5 kg of poly-n-butyl acrylate (molecular weight 22,000) is homogenized per hour in a screw extruder (ZSK 32 of Werner and Pfleiderer) and the extruded melt obtained is granulated and then milled. Only the grain fraction below 100 μm is used for the experiments.

EXAMPLE 7

10%, by weight, of the <100μ obtained according to Example 6 are mixed with 90%, by weight, of a fine powder <120μ obtained by the process indicated in Example 6 without the addition of acrylate additive. The product is applied to a metal plate by the EPS process, using a negative gum at 30 KV and a melting time of 10 minutes at 200° C. The coating is free from craters, the surface is hard and glossy and the cold fracture temperature determined according to DIN 53372 is −32° C. A comparison sample prepared without acrylate additive has numerous craters and irregularities in the surface and the cold fracture temperature is found to be only −16° C.

We claim:

1. A powder coating composition which consists essentially of:
    (1) from 99.95 to 80% by weight of one or more saponified ethylene/vinyl acetate copolymers and
    (2) from 20 to 0.05%, by weight, of one or more (meth) acrylic acid $C_1$–$C_{24}$ alkyl ester homo-or co-polymers.
2. A composition as claimed in claim 1, wherein from 0.1 to 5%, by weight, of (2) is present.
3. A process for the production of a coated substrate which comprises applying to a substrate a composition as claimed in claim 1.

* * * * *